(12) United States Patent
Limbeck

(10) Patent No.: US 8,715,873 B2
(45) Date of Patent: May 6, 2014

(54) FUEL CELL SYSTEM WITH IMPROVED COLD START PROPERTIES AND METHOD OF OPERATING SAME

(75) Inventor: Uwe Limbeck, Kirchheim (DE)

(73) Assignee: Daimler AG, Stuttgart (DE)

( * ) Notice: Subject to any disclaimer, the term of this patent is extended or adjusted under 35 U.S.C. 154(b) by 797 days.

(21) Appl. No.: 12/663,198

(22) PCT Filed: Apr. 22, 2008

(86) PCT No.: PCT/EP2008/003216
§ 371 (c)(1),
(2), (4) Date: Jun. 11, 2010

(87) PCT Pub. No.: WO2008/148445
PCT Pub. Date: Dec. 11, 2008

(65) Prior Publication Data
US 2010/0266913 A1    Oct. 21, 2010

(30) Foreign Application Priority Data
Jun. 4, 2007  (DE) .......................... 10 2007 026 003

(51) Int. Cl.
*H01M 8/04*    (2006.01)
(52) U.S. Cl.
USPC .......................................... 429/429; 429/428
(58) Field of Classification Search
USPC .......................................... 429/429, 428, 443
See application file for complete search history.

(56) References Cited

U.S. PATENT DOCUMENTS

| | | | |
|---|---|---|---|
| 2003/0077487 A1 | 4/2003 | Roberts et al. | |
| 2006/0046895 A1 | 3/2006 | Thacher et al. | |
| 2006/0057442 A1* | 3/2006 | Noetzel et al. | 429/13 |
| 2006/0088738 A1 | 4/2006 | Aso | |
| 2006/0234094 A1* | 10/2006 | Sakai | 429/24 |

FOREIGN PATENT DOCUMENTS

| | | |
|---|---|---|
| DE | 600 05 836 T2 | 5/2004 |
| WO | WO 01/24296 A1 | 4/2001 |
| WO | WO 01/48846 A1 | 7/2001 |

OTHER PUBLICATIONS

Notification of Transmittal of International Search Report and Written Opinion of the International Searching Authority, or the Declaration (Jan. 5, 2009) 13 pages.

* cited by examiner

Primary Examiner — Mark F Huff
Assistant Examiner — Monique Wills
(74) Attorney, Agent, or Firm — Crowell & Moring LLP

(57) ABSTRACT

A fuel cell system includes at least one fuel cell stack designed to react reactants for current generation, a cold start detection apparatus for detecting a cold start state of a fuel cell stack and a load which may be connected to the fuel cell stack 2. A control device is designed to connect the load when the fuel cell stack 2 is in the cold start state. The supply of the reactants for the fuel cell stack is conformed to connection of the load, and the control device is designed with software and/or circuitry so as to vary the connected load in one or more step load changes in response to detection of the cold start state of the fuel cell stack.

17 Claims, 2 Drawing Sheets

FUEL CELL SYSTEM WITH IMPROVED COLD START PROPERTIES AND METHOD OF OPERATING SAME

This application is a national stage of PCT International Application No. PCT/EP2008/003216, filed Apr. 22, 2008, which claims priority under 35 U.S.C. §119 to German Patent Application No. 10 2007 026 003.4, filed Jun. 4, 2007, the entire disclosure of which is herein expressly incorporated by reference.

The invention relates to a fuel cell system having at least one fuel cell stack for reacting reactants to generate an electric current. More particularly, the system according to the invention includes a cold start detection apparatus for detecting a cold start state of the fuel cell stack, a load which may be connected to the fuel cell stack, and a control device that is designed to connect the load when the fuel cell stack is in the cold start state. The supply of the reactants to the fuel cell stack is conformed to connection of the load. The invention also includes a corresponding method.

Fuel cell systems generate electrical current by reacting reactants, namely fuel (such as for example hydrogen) electrochemically together with an oxidant (such as for example oxygen or ambient air). Fuel cell systems conventionally comprise at least one fuel cell stack, which includes a plurality of fuel cells (often more than 100). Each fuel cell has a cathode and an anode area, which are separated from one another by a membrane (for example a PEM). The electrochemical process proceeds between these cathode or anode areas within the context of catalytic combustion of the reactants, and the efficiency of the electrochemical process is heavily dependent on process conditions. One important process condition relates to the operating temperature of the fuel cells, since the electrochemical process proceeds with the greatest economic viability and maximum energy yield in a temperature range of approx. 60° C. to 120° C.

While it appears simple to ensure such process conditions when fuel cell systems are put to stationary use, in the case of fuel cell systems put to mobile use (such as, for example, a drive energy source for vehicles), it is a challenge to keep the fuel cell system ready for operation, or to make it ready for operation in the shortest possible time, whatever the weather. The problem often also arises of effecting a cold start (i.e., starting the fuel cell system at a fuel cell temperature below the normal operating temperature). Particularly critical is so called sub-freezing starting of fuel cell systems at temperatures of below 0° C., during which fuel cell stack power is known to reduce markedly due to operation in the low temperature range.

One possible solution to this problem is to supply external heat; for example, using a burner or a heater to heat the fuel cell stack. However, this approach requires an external heat source and consumes valuable energy.

In another approach, disclosed in German patent document DE 600 05836 T2, during a start phase in which the fuel cell stack is at a starting temperature below its normal operating temperature, the reactant stream is depleted at at least some of the electrodes. Such depletion of the reactants causes a change of the electrode potential, which in turn leads to an increase in the electrode overvoltage. Consequently the amount of heat which is generated in the fuel cell stack at a predetermined operating current density is increased. In an alternative embodiment, in order to effect such depletion it is proposed to connect a transient electrical load to the fuel cell stack, once or intermittently without increasing the feed rates of the reactants. This procedure also increases the rate at which the reactants are consumed, thus reducing the stoichiometry of reactant feed and effecting depletion of the reactants.

Published U.S. patent Application No. US 2006/0088738 A1, which may constitute the closest prior art, discloses a fuel cell system and a method of controlling the same, in which it is proposed to connect an electrical load at low fuel cell stack operating temperatures and to achieve self-heating of the fuel cell stack by drawing a constant load. A disadvantage of this procedure would appear to be that heating up extends the start time and consumes fuel. In a second, downstream procedure, in response to a low battery temperature, it is proposed to heat the battery by charging and discharging processes in dynamic interplay with the fuel cell stack.

One object of the present invention, therefore, is to provide a fuel cell system and a corresponding operating method which enable an energy-efficient cold start of the fuel cell system.

This and other objects and advantages are achieved by the method and apparatus according to the invention, which provides a fuel cell system that is preferably designed and/or suitable for mobile use, particularly in vehicles. The fuel cell system according to the invention comprises one or more fuel cell stacks, each of which includes a plurality (in particular, more than 100) of fuel cells. Each fuel cell comprises an anode and a cathode area which are areas separated from one another by a membrane (in particular, a proton exchange membrane, or ("PEM"). The fuel cells or the fuel cell stack are designed to carry out an electrochemical reaction of reactants with one another, preferably a fuel, in particular hydrogen, which originates for example from a tank or a reformer, and an oxidant, in particular oxygen or ambient air, in order to generate electrical current.

The fuel cell system according to the invention comprises a cold start detection apparatus for detecting a cold start state of the fuel cell stack. Preferably, in such a cold start state the temperature of the fuel cell stack is below its normal operating temperature. (More particularly, the cold start state may be a subfreezing start state; that is, the fuel cell stack temperature is below 0° C.) In one possible embodiment of the invention, the cold start detection apparatus may be designed as a temperature sensor, which detects the temperature of the fuel cell stack or the fuel cells. Alternatively, the cold start detection apparatus may also be designed to detect the cold start state of the fuel cell stack by means of relative measurement or even estimation.

The fuel cell stack is interconnected and/or interconnectable with a connectable load, such that the current demanded of the fuel cell stack may be increased. The connectable load may be of any desired design. For instance, it may take the form of a primary consumer, such as a drive motor, a secondary consumer, such as a vehicle heater or air conditioning system, or a tertiary consumer, such as an energy storage device or the like. Preferably, the connectable load is so selected that the energy fed thereto is not lost but may instead be used in another manner.

To control the fuel cell system, a control device is provided which is designed to connect the load, at least in the cold start state of the fuel cell stack, and at the same time to adapt the feed of the reactants for the fuel cell stack to connection of the load. The control device may take the form of a combined, superordinate control device, or alternatively it may also be organized in a decentralized manner, such that connection of the load and feed of the reactants may be matched to one another but be effected by separate control devices. In particular, the control device is designed in such a way that, upon connection of the load, no depletion of the reactants takes place, as is known from the prior art.

According to the invention the control device may be in the form of software and/or circuitry so as to vary the connected load in one or more step load changes in response to detection of a cold start state of the fuel cell stack. Thus, a control-related interrelationship exists between detection of the cold start state and variation of the connected load. The control-related interrelationship may for example take the form of sequential control, closed-loop control or a closed- or open-loop control circuit. Detection of the cold start state forms an input quantity and variation of the connected load forms an output quantity. A more complex control-related interrelationship, such as for example control using adaptive controllers, neural networks, etc. also falls within the scope of the invention. It is essential in this respect for the variation in load to take place in one or more step load changes in response to detection of the cold start state of the fuel cell stack.

The Applicants have determined that varying the connected load in one or more step load changes can markedly accelerate the cold start process. While connection of a constant load sink causes the polarization characteristic of the fuel cell stack to rise at a virtually constant gradient, a step load change in the connected load results in a stair-like profile for the polarization characteristic, and thus, at the same time, a superproportional increase in the power of the fuel cell stack.

In a preferred embodiment, the step load change takes the form of a reduction in the connected load and/or the current requirement of the fuel cell stack. This experimentally verified preferred embodiment is surprising in that an increase in the power of the fuel cell stack is achieved by a previously effected reduction in current requirement. On the one hand, this behavior appears contrary to the idea of achieving self-heating of the fuel stack by drawing a load, while on the other hand this behavior also appears contrary to the above-acknowledged German patent document DE 600 05836 T2, since the procedure proposed according to the invention does not cause a depletion of reactants, but instead a surplus of the reactants. Accordingly, it is also within the scope of the invention to improve the cold start behavior of a fuel cell system by a surplus of reactants in the start phase.

In a further embodiment of the invention, the amplitude of the step load change amounts to at least 30%, preferably at least 60%, and in particular at least 90% of the connected load and/or the current requirement prevailing in the case of the connected load. In the latter case in particular, the fuel cell stack is connected virtually or—in another embodiment, completely—without load.

It has been found that it is sufficient for the duration of the step load change to amount to less than 3 seconds (preferably less than 2 seconds, and in particular, less than 1 second). The duration of the step load change is defined for example as the peak width at the FWHM height (Full Width Half Maximum). Thus, in a preferred embodiment, the step load change takes the form of a negative peak in the profile of the load and/or of the current, preferably precisely one step load change being performed during the cold start phase.

In a preferred further development of the invention, the fuel cell system comprises a travel enabling device, which is designed to output a travel enabling signal and/or a travel disabling signal for the fuel cell system.

In one particularly preferred embodiment of the invention, the control device is designed such that the step load change(s) is/are actuated when travel is disabled (i.e., in particular, prior to travel being enabled). The invention is accordingly implemented, during the self-heating process of the fuel cell stack, by varying the load sinks, for example in a vehicle, before the vehicle is enabled to travel.

In an alternative, likewise preferred embodiment, which may also constitute an addition, the control device is designed to actuate the step load change when travel has been enabled; that is, when the vehicle is in dynamic operation. It is particularly preferred, but not limited thereto, for the step load change or changes to be effected, when travel has been enabled, by load distribution between an energy storage device, such as a battery, a capacitor or a supercap, and the fuel cell stack. In this respect, advantage is taken of the fact that loads or load sinks may be varied or distributed in a highly dynamic manner by skillful or adapted energy management between the energy storage device and the fuel cell stack.

The present invention also provides a method for cold start, (especially, sub-freezing start) of a fuel cell system that is constructed as just described. A cold start state of a fuel cell stack is first detected, and an electrical load is connected to the fuel cell stack at the same time or thereafter. The reactant supply for this fuel cell stack is adapted to the connected load at or close to the same time, and the load is varied with at least one step load change in response to the detected cold start state.

The method according to the invention is designed for proper use of the above-described fuel cell system. Consequently, the fuel cell system described is also designed for implementation of the claimed method.

In a preferred implementation of the method, the step load change(s) take(s) place within five minutes (preferably three minutes, or in particular two minutes) of starting or cold starting of the fuel cell system. In an exemplary embodiment, the step load change is performed between 120 and 130 seconds after the cold start.

Other objects, advantages and novel features of the present invention will become apparent from the following detailed description of the invention when considered in conjunction with the accompanying drawings.

DETAILED DESCRIPTION OF THE DRAWINGS

Figure 1:
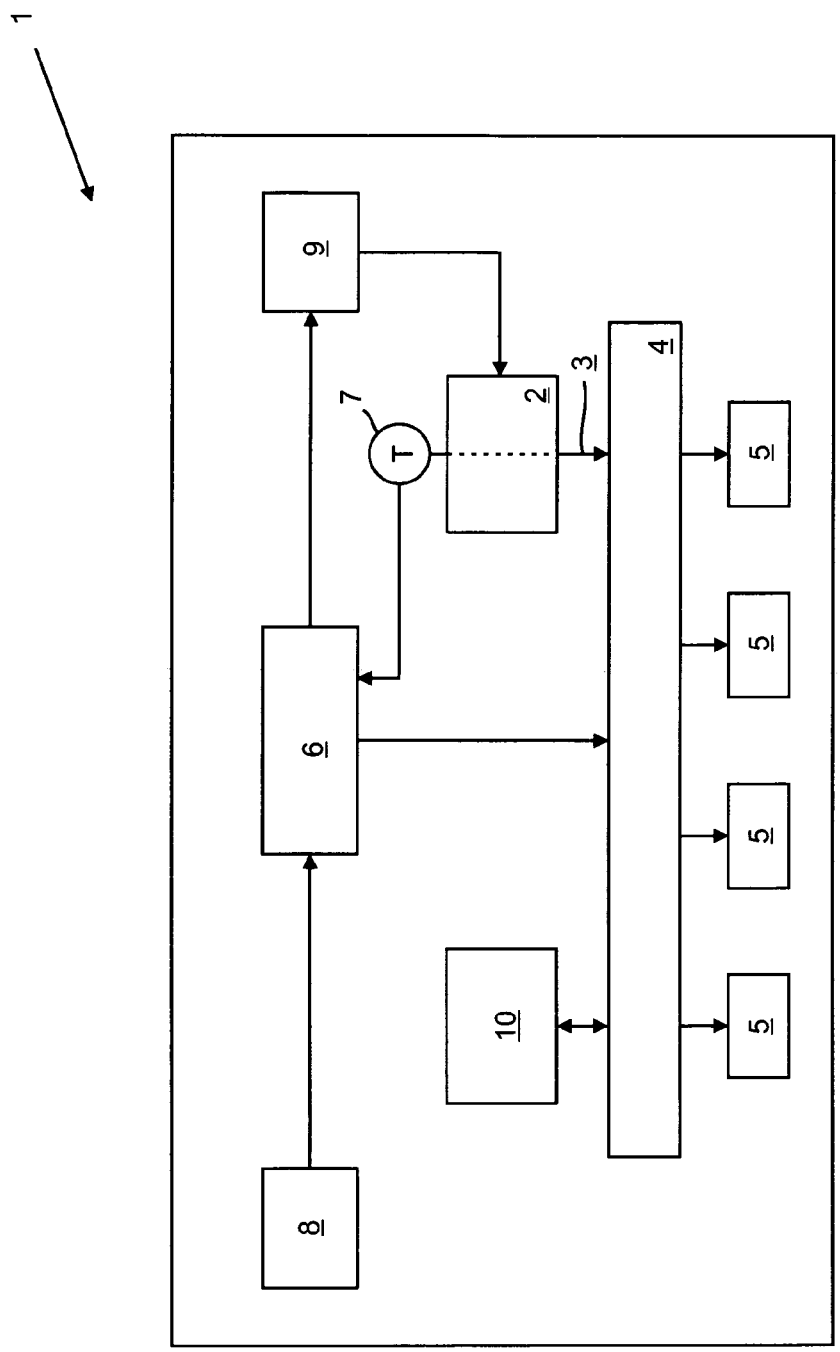
FIG. 1 shows a block diagram of a fuel cell device as an exemplary embodiment of the invention.

FIG. 1 shows a fuel cell system 1, which is designed, for example, for use as a mobile fuel cell system in a vehicle for generating drive energy. The fuel cell system 1 comprises one or more fuel cell stacks 2 (one such fuel cell stack 2 being shown in FIG. 1). The fuel cell stack 2 comprises a plurality of fuel cells; more than 100 fuel cells may be arranged in one fuel cell stack 2, for example.

The fuel cell stack 2 comprises a load output 3, which is connected by circuitry to one or more load sinks 5 via a load manager 4. The load sinks 5 may take the form, for example, of a heater, drive, air conditioning system or the like. An integrated control device 6 controls the load manager 4, and organizes distribution of the load by the load manager 4. The control device 6 receives as input quantities a signal from a temperature sensor 7 which measures the temperature of the fuel cell stack 2 or of the fuel cells. Optionally, the control device also receives as an input quantity, a signal from an enable module 8, which enables or disables the fuel cell system 1 for travel operation. An output of the control device 6 is connected to a reactant controller 9, which controls the inflow of the reactants or the inflow stoichiometry (i.e., the proportion of reactants in the inflow streams).

As a further option, the fuel cell system 1 has an energy storage device in the form of a battery 10, which may be connected to the load sinks 5 and/or to the output 3 of the fuel cell stack 2 via the load manager 4.

From a functional standpoint, the control device 6 is so designed with regard to software and/or circuitry, such that it assists in a cold start of the fuel cell system through an adapted start sequence. To this end, the control device 6 evaluates the signal of the temperature sensor 7 by comparing the measured value with a predetermined value for the operating temperature of the fuel cell system 1 or for the fuel cell stack 2. If the measured value is below this operating temperature or below a further, freely definable limit temperature, the partial start sequence is performed by the control device 6. The limit temperature is preferably defined as less than 0° C., such that the cold start is performed in particular as a sub-freezing start.

In a first step of the cold start sequence, one or more load sinks 5 are connected to the output 3 of the fuel cell stack 2 by the load manager 4, such that the fuel cell stack 2 has to output power and begins to heat up as a result of the power output. At the same time or in conjunction with connection of the load, the reactant controller is actuated, such that the reactant supply and/or stoichiometry is adapted to the increased load requirement. During a first warm-up phase, which may last 120 seconds for example, the fuel cell stack is subjected to a uniform power take-up and/or current requirement. In a second cold start phase, the load manager 4 is actuated by the control device in such a way that the load and/or the current requirement is modified dynamically for a short time. During this modification, the control signal from the control device 6 to the reactant controller 9 remains unchanged, so that the reactant supply or stoichiometry likewise remains substantially unchanged. After the short step load change or step change in the current requirement, in a third cold start phase a constant load is again applied to the output 3 by connecting the load sinks 5.

Measurements have shown that, in the described start sequence with step load change, the power output and/or the current output and/or the polarization characteristic between the first cold start phase and the third cold start phase is varied in stages and/or steps, and in particular, superproportionally. For instance, it was clear that the performance of the fuel cell stack 2 increases markedly after the dynamic step load change.

When the control device 6 is interconnected with the enable module 8, the described step load change may be performed in two operating phases. In the first alternative, the step load change is performed during the self-heating process of the fuel cell stack by varying the load sinks 5, before the enable module 8 passes on a travel enabling signal to the control device 6. In another alternative, the second cold start phase takes place after travel has been enabled by the enable module 8 when the vehicle is in dynamic operation. In this case, in order to provide sufficient power for travel operation, the load manager 4 is actuated by the control device 6 in such a way that the loads between fuel cell stack 2 and battery 10 may in particular be dynamically varied. In the second alternative, it is thus possible for the step load change to be implemented by brief connection of the battery 10 to the load sinks 5 and discharge thereof and simultaneous uncoupling or relieving of the fuel cell stack 2 by the load manager 4.

Figure 2:
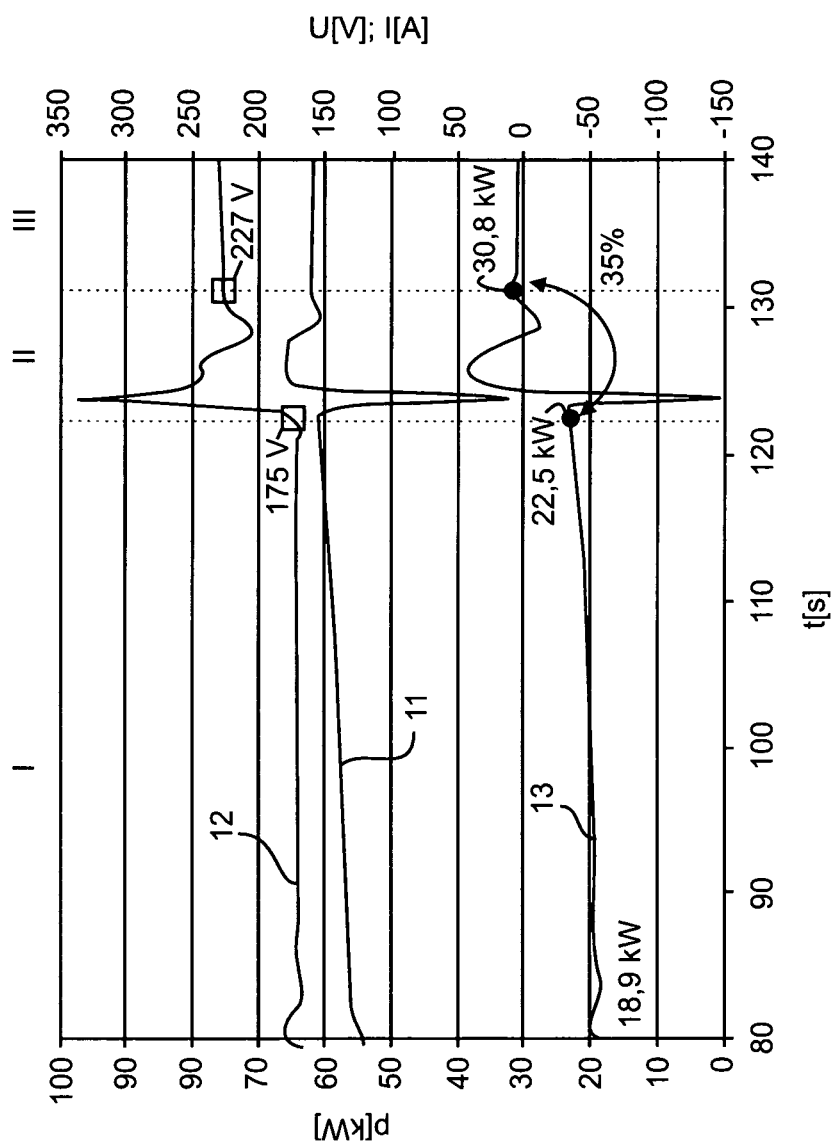
FIG. 2 is a graphic depiction of a measurement record to illustrate the invention.

FIG. 2 is an example of a measurement record of a cold start procedure. A first measurement curve 11 represents the current at the output 3 of the fuel cell stack 2, while a second measurement curve 12 shows the voltage or the polarization characteristic of the fuel cell stack 2 likewise at the output 3. A third measurement curve 13 represents the drawn power (net power) of the fuel cell stack 2.

As is clear from the plotted curves, in a first cold start phase I a constant load is connected to the output 3 of the fuel cell stack 2, and the measurement curves for power 13, current 11 and voltage 12 rise slowly. The plotted curves in FIG. 2 show, for example, that in a time interval of 80 to 120 seconds a power increase from 18.8 kW to 22.4 kW was measured.

In the second cold start phase II, the current requirement 11 is reduced for a short time (less than 1 second) from 150 amperes to 10 amperes and then immediately raised once again to 176 amperes. In direct response thereto, the power 13 drops at the same time, approaching zero, while the voltage rises by approx. 50%.

In the third cold start phase III, a constant load is again connected. In comparison with the first cold start phase I, all of the output current according to measurement curve 11, the output power according to measurement curve 13 and the output voltage or the polarization characteristic according to measurement curve 12 have risen markedly. If the end of the first cold start phase I is compared with the start of the third cold start phase III, it becomes clear that the performance of the fuel cell stack has increased by approx. 35% after this dynamic step load change.

Finally, it should be noted that, by introducing one or more step load changes during the sub-freezing start or cold start of the fuel cell stack 2 using constant load sinks, self-heating of the fuel cell stack 2 may be greatly accelerated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fuel cell system comprising:
   at least one fuel cell stack designed to react reactants for current generation;
   a cold start detection apparatus for detecting a cold start state of the fuel cell stack;
   a load that is connectable to the fuel cell stack; and
   a control device programmed to connect the load when the fuel cell stack is in the cold start state, with feed of the reactants for the fuel cell stack being conformed to connection of the load; wherein,
   the control device is programmed to vary a connected load in at least one step load change in response to a detection of the cold start state of the fuel cell stack by increasing a current or power output of the fuel cell for a first period of time, decreasing the current output or connected load of the fuel cell during a second period of time that is subsequent to the first period of time, and increasing the connected load of the fuel cell during a third period of time that is subsequent to the second period of time.

2. The fuel cell system according to claim 1, further comprising:
   a travel enabling device, which is designed to output a travel enabling/disabling signal for the fuel cell system.

3. The fuel cell system according to claim 1, wherein an amplitude of the step load change during the second period of time is at least 30% of the connected load.

4. The fuel cell system according to claim 1, wherein an amplitude of the step load change during the second period of time is at least 60% of the connected load.

5. The fuel cell system according to claim 1, wherein an amplitude of the step load change during the second period of time is at least 90% of the connected load.

6. The fuel cell system according to claim 1, wherein a duration of the second period of time is less than 3 s.

7. The fuel cell system according to claim 1, wherein a duration of the second period of time is less than 2 s.

8. The fuel cell system according to claim 1, wherein a duration of the second period of time is less than 1 s.

9. The fuel cell system according to claim 2, wherein the control device actuates the step load change when a travel disabling signal is present.

10. The fuel cell system according to claim 2, wherein the control device actuates the step load change when a travel enabling signal is present.

11. The fuel cell system according to claim 10, wherein the step load change is effected by load distribution between an energy storage device and the fuel cell stack.

12. A method for cold starting a fuel cell system, said method comprising:
    detecting a cold start state of a fuel cell stack;
    connecting a load to the fuel cell stack and bringing a reactant supply for the fuel cell stack into line; and
    varying the load with at least one step load change in response to a detected cold start state by increasing a current or power output of the fuel cell for a first period of time, decreasing the current output or connected load of the fuel cell during a second period of time that is subsequent to the first period of time, and increasing the connected load of the fuel cell during a third period of time that is subsequent to the second period of time.

13. The method according to claim 12, wherein the step load change takes place before the fuel cell stack is enabled for travel.

14. The method according to claim 12, wherein the step load change takes place after enabling for travel when the fuel cell stack is in dynamic operation and through a load redistribution to an energy storage device.

15. The method according to claim 12, wherein a sum of the first, second, and third periods of time is less than 5 min.

16. The method according to claim 12, wherein a sum of the first, second, and third periods of time is less than 3 min.

17. The method according to claim 12, wherein a sum of the first, second, and third periods of time is less than 2 min.

* * * * *